(12) United States Patent
Chen et al.

(10) Patent No.: US 10,807,040 B2
(45) Date of Patent: Oct. 20, 2020

(54) ASC/DEC WITH REAR-CONCENTRATED EXOTHERM GENERATION

(71) Applicant: Johnson Matthey Public Limited Company, London (GB)

(72) Inventors: Hai-Ying Chen, Wayne, PA (US); Joseph Michael Fedeyko, Wayne, PA (US); Jing Lu, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 114 days.

(21) Appl. No.: 15/939,357

(22) Filed: Mar. 29, 2018

(65) Prior Publication Data

US 2018/0280876 A1   Oct. 4, 2018

Related U.S. Application Data

(60) Provisional application No. 62/478,806, filed on Mar. 30, 2017.

(51) Int. Cl.
*B01J 21/06*   (2006.01)
*B01J 23/22*   (2006.01)
(Continued)

(52) U.S. Cl.
CPC ......... *B01D 53/9418* (2013.01); *B01D 53/58* (2013.01); *B01D 53/9436* (2013.01); *B01D 53/9472* (2013.01); *B01J 21/063* (2013.01); *B01J 23/22* (2013.01); *B01J 23/30* (2013.01); *B01J 23/42* (2013.01); *B01J 23/44* (2013.01); *B01J 23/6482* (2013.01); *B01J 23/6527* (2013.01); *F01N 3/035* (2013.01); *F01N 3/208* (2013.01); *B01D 2251/2062* (2013.01); *B01D 2255/102* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/2092* (2013.01); *B01D 2255/20707* (2013.01); *B01D 2255/20723* (2013.01);
(Continued)

(58) Field of Classification Search
CPC . B01J 21/063; B01J 23/22; B01J 23/30; B01J 23/42; B01J 23/44; B01J 23/6482; B01J 23/6527; F01N 3/035; F01N 3/208; B01D 53/58; B01D 53/9418; B01D 53/9436; B01D 53/9472
See application file for complete search history.

(56) References Cited

U.S. PATENT DOCUMENTS 9,579,603 B2 *   2/2017   Sonntag ............... B01J 35/0006
9,597,636 B2 *   3/2017   Sonntag ............. B01D 53/9472
(Continued)

*Primary Examiner* — Cam N. Nguyen

(57) ABSTRACT

A catalyst article including a substrate with an inlet side and an outlet side, a first zone and a second zone, where the first zone includes an ammonia slip catalyst (ASC) comprising a platinum group metal on a support and a first SCR catalyst; where the second zone includes a catalyst selected from the group consisting of a diesel oxidation catalyst (DOC) and a diesel exotherm catalyst (DEC); and where the first zone is located upstream of the second zone. The first zone may include a bottom layer with a blend of: (1) the platinum group metal on a support and (2) the first SCR catalyst; and a top layer comprising a second SCR catalyst, the top layer located over the bottom layer.

23 Claims, 9 Drawing Sheets

(51) Int. Cl.
*B01J 23/30* (2006.01)
*B01J 23/42* (2006.01)
*B01J 23/44* (2006.01)
*B01J 23/648* (2006.01)
*B01J 23/652* (2006.01)
*F01N 3/035* (2006.01)
*F01N 3/20* (2006.01)
*B01D 53/58* (2006.01)
*B01D 53/94* (2006.01)

(52) U.S. Cl.
CPC ............ *B01D 2255/20761* (2013.01); *B01D 2255/20776* (2013.01); *B01D 2255/30* (2013.01); *B01D 2255/502* (2013.01); *B01D 2255/504* (2013.01); *B01D 2255/9022* (2013.01); *B01D 2255/9032* (2013.01); *B01D 2255/9035* (2013.01); *B01D 2258/012* (2013.01); *F01N 2330/06* (2013.01); *F01N 2560/06* (2013.01); *F01N 2570/18* (2013.01); *F01N 2610/02* (2013.01); *F01N 2900/1616* (2013.01)

(56) References Cited

U.S. PATENT DOCUMENTS

| | | | |
|---|---|---|---|
| 9,878,287 B2 * | 1/2018 | Lu | B01J 29/80 |
| 9,878,636 B2 * | 1/2018 | Irvin, Sr. | B60L 13/04 |
| 9,993,772 B2 * | 6/2018 | Gilbert | B01D 53/9436 |
| 10,201,807 B2 * | 2/2019 | Larsson | B01D 53/9418 |
| 10,500,571 B2 * | 12/2019 | Greenham | B01J 29/723 |
| 2011/0271664 A1 | 11/2011 | Boorse et al. | |
| 2015/0037233 A1 | 2/2015 | Fedeyko et al. | |
| 2016/0367941 A1 | 12/2016 | Gilbert et al. | |
| 2016/0367973 A1 | 12/2016 | Larsson et al. | |
| 2016/0367975 A1 * | 12/2016 | Lu | B01J 37/0244 |
| 2018/0045097 A1 * | 2/2018 | Tang | B01J 37/0246 |
| 2018/0078926 A1 * | 3/2018 | Chen | B01J 23/42 |
| 2018/0111086 A1 * | 4/2018 | Chen | B01D 53/9418 |
| 2018/0280877 A1 * | 10/2018 | Chen | F01N 3/2066 |
| 2018/0283250 A1 * | 10/2018 | Chen | B01J 23/44 |
| 2019/0001268 A1 * | 1/2019 | Chen | B01J 35/0006 |
| 2019/0168198 A1 * | 6/2019 | Larsson | B01D 53/9418 |

* cited by examiner

ASC/DEC WITH REAR-CONCENTRATED EXOTHERM GENERATION

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide), with NO being the majority of the NOx formed. NOx is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. NOx needs to be reduced selectively with a catalyst and a reductant in a process known as selective catalytic reduction (SCR) that converts NOx into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalyzed substrate. In order to maximize the conversion of NOx, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

It would be desirable to have a catalyst that provides for both NOx removal by SCR and for selective ammonia conversion to nitrogen, where ammonia conversion occurs over a wide range of temperatures in a vehicle's driving cycle, and minimal nitrogen oxide and nitrous oxide byproducts are formed.

SUMMARY OF THE INVENTION

According to some embodiments of the present invention, a catalyst article includes a substrate having an inlet side and an outlet side, a first zone and a second zone, where the first zone comprises an ammonia slip catalyst (ASC) comprising a platinum group metal on a support and a first SCR catalyst; where the second zone comprises a catalyst selected from the group consisting of a diesel oxidation catalyst (DOC) and a diesel exotherm catalyst (DEC); and where the first zone is located upstream of the second zone. The first zone may include a bottom layer comprising a blend of: (1) the platinum group metal on a support and (2) the first SCR catalyst; and a top layer comprising a second SCR catalyst, the top layer located over the bottom layer. In some embodiments, the first zone comprises a bottom layer comprising the platinum group metal on a support; and a top layer comprising the first SCR catalyst, the top layer located over the bottom layer.

In some embodiments, the support comprises a siliceous material. The siliceous material comprises a material selected from the group consisting of: (1) silica; (2) a zeolite with a silica-to-alumina ratio higher than 200; and (3) amorphous silica-doped alumina with SiO2 content ≥40%. In some embodiments, the platinum group metal is present on the support in an amount of about 0.5 wt % to about 10 wt % of the total weight of the platinum group metal and the support; about 1 wt % to about 6 wt % of the total weight of the platinum group metal and the support; or about 1.5 wt % to about 4 wt % of the total weight of the platinum group metal and the support. In some embodiments, the platinum group metal may comprise platinum, palladium or a combination of platinum and palladium. In certain embodiments, the platinum group metal comprises platinum.

Within the blend, a weight ratio of the first SCR catalyst to the platinum group metal on a support may be about 3:1 to about 300:1; about 5:1 to about 100:1; or about 10:1 to about 50:1.

In some embodiments, the first SCR catalyst is a base metal, an oxide of a base metal, a molecular sieve, a metal exchanged molecular sieve or a mixture thereof. In some embodiments, the first SCR catalyst comprises copper. In some embodiments, the second SCR catalyst is a base metal, an oxide of a base metal, a molecular sieve, a metal exchanged molecular sieve or a mixture thereof.

The first zone and the second zone may be located on a single substrate, with the first zone located on the inlet side of the substrate and the second zone located on the outlet side of the substrate. In some embodiments, the substrate comprises a first substrate and a second substrate, where the first zone is located on the first substrate and the second zone is located on the second substrate and the first substrate is located upstream of the second substrate.

According to some embodiments of the present invention, a method of reducing emissions from an exhaust stream includes contacting the exhaust stream with a catalyst article having a substrate with an inlet side and an outlet side, a first zone and a second zone, where the first zone comprises an ammonia slip catalyst (ASC) comprising a platinum group metal on a support and a first SCR catalyst; where the second zone comprises a catalyst selected from the group consisting of a diesel oxidation catalyst (DOC) and a diesel exotherm catalyst (DEC); and where the first zone is located upstream of the second zone. The first zone may include a bottom layer comprising a blend of: (1) the platinum group metal on a support and (2) the first SCR catalyst; and a top layer comprising a second SCR catalyst, the top layer located over the bottom layer. In some embodiments, the first zone comprises a bottom layer comprising the platinum group metal on a support; and a top layer comprising the first SCR catalyst, the top layer located over the bottom layer.

According to some embodiments of the present invention, a catalyst article includes a substrate having an inlet end and an outlet end, a first zone, a second zone, and a third zone, where the first zone includes a second SCR catalyst; where the second zone includes an ammonia slip catalyst (ASC) comprising a blend of: (1) a platinum group metal on a support and (2) a first SCR catalyst; where the third zone comprises a catalyst ("third zone catalyst") selected from the group consisting of a diesel oxidation catalyst (DOC) and a diesel exotherm catalyst (DEC); and where the first zone is located upstream of the second zone, and the second zone is located upstream of the third zone. In some embodiments, the ASC is included in a first layer; the third zone catalyst is included in a second layer which extends from the outlet end to less than a total length of the substrate, where the second layer is located on top of the first layer and is shorter in length than the first layer; and the second SCR catalyst is included in a layer which extends from the inlet end to less than a total length of the substrate, and which at least partially overlaps the first layer. In some embodiments, the first layer extends from the outlet end to less than a total length of the substrate.

In some embodiments, the support comprises a siliceous material. The siliceous material comprises a material selected from the group consisting of: (1) silica; (2) a zeolite with a silica-to-alumina ratio higher than 200; and (3) amorphous silica-doped alumina with SiO2 content ≥40%. In some embodiments, the platinum group metal is present on the support in an amount of about 0.5 wt % to about 10 wt % of the total weight of the platinum group metal and the support; about 1 wt % to about 6 wt % of the total weight of the platinum group metal and the support; or about 1.5 wt % to about 4 wt % of the total weight of the platinum group metal and the support. In some embodiments, the platinum group metal may comprise platinum, palladium or a combination of platinum and palladium. In certain embodiments, the platinum group metal comprises platinum.

Within the blend, a weight ratio of the first SCR catalyst to the platinum group metal on a support may be about 3:1 to about 300:1; about 5:1 to about 100:1; or about 10:1 to about 50:1.

In some embodiments, the first SCR catalyst is a base metal, an oxide of a base metal, a molecular sieve, a metal exchanged molecular sieve or a mixture thereof. In some embodiments, the first SCR catalyst comprises copper. In some embodiments, the second SCR catalyst is a base metal, an oxide of a base metal, a molecular sieve, a metal exchanged molecular sieve or a mixture thereof.

In some embodiments, the first zone, the second zone, and the third zone are located on a single substrate and the first zone is located on the inlet side of the substrate and the third zone is located on the outlet side of the substrate. In some embodiments, the substrate comprises a first substrate and a second substrate, where the first zone and second zone are located on the first substrate and the third zone is located on the second substrate and the first substrate is located upstream of the second substrate. In some embodiments, the substrate comprises a first substrate, a second substrate, and a third substrate, where the first zone is located on the first substrate, the second zone is located on the second substrate, and the third zone is located on the third substrate, and the first substrate is located upstream of the second substrate and the second substrate is located upstream of the third substrate.

According to some embodiments of the present invention, a method of reducing emissions from an exhaust stream includes contacting the exhaust stream with a catalyst article comprising a substrate comprising an inlet end and an outlet end, a first zone, a second zone, and a third zone, where the first zone includes a second SCR catalyst; where the second zone includes an ammonia slip catalyst (ASC) comprising a blend of: (1) a platinum group metal on a support and (2) a first SCR catalyst; where the third zone includes a catalyst ("third zone catalyst") selected from the group consisting of a diesel oxidation catalyst (DOC) and a diesel exotherm catalyst (DEC); and where the first zone is located upstream of the second zone, and the second zone is located upstream of the third zone. In some embodiments, the ASC forms a first layer; the third zone catalyst forms a second layer and extends from the outlet end to less than a total length of the substrate, where the second layer is shorter in length than the first layer; and the second SCR catalyst extends from the inlet end to less than a total length of the substrate. In some embodiments, the first layer extends from the outlet end to less than a total length of the substrate.

DETAILED DESCRIPTION OF THE INVENTION

Catalysts of the present invention relate to catalyst articles including various configurations of SCR catalyst(s), ASC, and DOC or DEC. The catalysts and specific configurations are described in further detail below.

Two Zone Configuration

Embodiments of the present invention relate to catalyst articles having a first zone and a second zone, the first zone including an ammonia slip catalyst (ASC) comprising a platinum group metal on a support and a first SCR catalyst; and the second zone including a diesel oxidation catalyst (DOC) or diesel exotherm catalyst (DEC). The first zone may be configured to include a bottom layer including a blend of (1) the platinum group metal on a support, and (2) the first SCR catalyst; and a top layer including a second SCR catalyst, wherein the top layer is located over the bottom layer. In some embodiments, the first zone may be configured to include a bottom layer including the platinum group metal on a support; and a top layer including the first SCR catalyst, wherein the top layer is located over the bottom layer. In some embodiments, the first and second zone are located on a single substrate, with the first zone located on the inlet side of the substrate and the second zone located on the outlet side of the substrate. In another embodiment, the first zone is located on a first substrate and the second zone is located on a second substrate, wherein the first substrate is located upstream of the second substrate.

The first and second substrate may be close coupled. When the first and second substrate are close coupled, the second substrate may be placed close to and/or directly downstream from the first substrate.

Figure 2:
FIG. 2 depicts a catalyst configuration having an SCR in a first zone, an ASC/SCR blend in a second zone, and a DOC or DEC in a third zone.

FIG. 2 illustrates a two-zone configuration of embodiments of the present invention, with a first zone having a bottom layer with a blend of a platinum group metal on a support and an SCR catalyst, and a top layer including an SCR catalyst. The second zone includes a DOC.

A method of reducing emissions from an exhaust stream may include contacting the exhaust stream with a catalyst article as described herein.

Three Zone Configuration

Embodiments of the present invention relate to catalyst articles having a first zone, a second zone, and a third zone. The first zone may include an SCR catalyst. The second zone may include an ASC having a blend of a platinum group metal on a support with a first SCR catalyst. The third zone may include a catalyst ("third zone catalyst") such as a DOC or DEC. The first zone is located upstream of the second zone, and the second zone is located upstream of the third zone.

In some embodiments, the ASC is included in a first layer. The third zone catalyst may be located in a second layer which extends from the outlet end to less than a total length of the substrate, and the second layer is located on top of the first layer and is shorter in length than the first layer. The second SCR catalyst may be included in a layer which extends from the inlet end to less than a total length of the substrate, and which at least partially overlaps the first layer. In some embodiments, the first layer extends from the outlet end to less than a total length of the substrate. In some embodiments, the first layer extends from the inlet end to less than a total length of the substrate.

In some embodiments, the first zone, the second zone, and the third zone are located on a single substrate and the first zone is located on the inlet side of the substrate and the third zone is located on the outlet side of the substrate. In some embodiments, the first zone and second zone are located on a first substrate and the third zone is located on a second substrate, and the first substrate is located upstream of the second substrate. The first and second substrate may be close coupled. When the first and second substrate are close coupled, the second substrate may be placed close to and/or directly downstream from the first substrate.

In some embodiments, the first zone is located on a first substrate, the second zone is located on a second substrate, and the third zone is located on a third substrate, where the first substrate is located upstream of the second substrate and the second substrate is located upstream of the third substrate. The first, second, and/or third substrate may be close coupled. When the first, second, and/or third substrate are close coupled, the second substrate may be placed close to and/or directly downstream from the first substrate, and the third substrate may be placed close to and/or directly downstream from the second substrate.

FIG. 2 illustrates a three-zone configuration of embodiments of the present invention, with a first zone including an SCR catalyst, the second zone may including an ASC having a blend of a platinum group metal on a support with an SCR catalyst, and the third zone including a DOC. The first zone is located upstream of the second zone, and the second zone is located upstream of the third zone. In the configuration of FIG. 2, the blend is included in a bottom layer which extends from the outlet end of the substrate toward the inlet end, covering less than the total length of the substrate. The DOC is included in a top layer located on top of the bottom layer, which extends from the outlet end of the substrate and extends less than the length of the bottom layer. The first zone SCR catalyst is included in a layer which extends from the inlet end of the substrate and extends toward the outlet end, covering less than a total length of the substrate, and which overlaps the bottom layer including the blend.

Figure 3:
FIG. 3 depicts a catalyst configuration having an SCR in a first zone, an ASC/SCR blend in a second zone, and an impregnated DOC or DEC in a third zone.

FIG. 3 illustrates a three-zone configuration of embodiments of the present invention, with a first zone including an SCR catalyst, the second zone may including an ASC having a blend of a platinum group metal on a support with an SCR catalyst, and the third zone including a DOC. The first zone is located upstream of the second zone, and the second zone is located upstream of the third zone. In the configuration of FIG. 2, the blend is included in a bottom layer which extends from the outlet end of the substrate toward the inlet end, covering less than the total length of the substrate. The DOC zone is impregnated with a solution of platinum nitrate or palladium nitrate or a mixture of platinum and palladium nitrate. The first zone SCR catalyst is included in a layer which extends from the inlet end of the substrate and extends toward the outlet end, covering less than a total length of the substrate, and which overlaps the bottom layer including the blend.

A method of reducing emissions from an exhaust stream may include contacting the exhaust stream with a catalyst article as described herein.

Ammonia Oxidation Catalyst

Catalyst articles of the present invention may include one or more ammonia oxidation catalysts, also called an ammonia slip catalyst ("ASC"). One or more ASC may be included with or downstream from an SCR catalyst, to oxidize excess ammonia and prevent it from being released to the atmosphere. In some embodiments the ASC may be included on the same substrate as an SCR catalyst, or blended with an SCR catalyst. In certain embodiments, the ammonia oxidation catalyst material may be selected to favor the oxidation of ammonia instead of the formation of $NO_x$ or $N_2O$. Preferred catalyst materials include platinum, palladium, or a combination thereof. The ammonia oxidation catalyst may comprise platinum and/or palladium supported on a metal oxide. In some embodiments, the catalyst is disposed on a high surface area support, including but not limited to alumina.

In some embodiments, the ammonia oxidation catalyst comprises a platinum group metal on a siliceous support. A siliceous material may include a material such as: (1) silica; (2) a zeolite with a silica-to-alumina ratio of at least 200; and (3) amorphous silica-doped alumina with SiO2 content ≥40%. In some embodiments, a siliceous material may include a material such as a zeolite with a silica-to-alumina ratio of at least 200; at least 250; at least 300; at least 400; at least 500; at least 600; at least 750; at least 800; or at least 1000. In some embodiments, a platinum group metal is present on the support in an amount of about 0.5 wt % to about 10 wt % of the total weight of the platinum group metal and the support; about 1 wt % to about 6 wt % of the total weight of the platinum group metal and the support; about 1.5 wt % to about 4 wt % of the total weight of the platinum group metal and the support; about 10 wt % of the total weight of the platinum group metal and the support; about 0.5 wt % of the total weight of the platinum group metal and the support; about 1 wt % of the total weight of the platinum group metal and the support; about 2 wt % of the total weight of the platinum group metal and the support; about 3 wt % of the total weight of the platinum group metal and the support; about 4 wt % of the total weight of the platinum group metal and the support; about 5 wt % of the total weight of the platinum group metal and the support; about 6 wt % of the total weight of the platinum group metal and the support; about 7 wt % of the total weight of the platinum group metal and the support; about 8 wt % of the total weight of the platinum group metal and the support; about 9 wt % of the total weight of the platinum group metal and the support; or about 10 wt % of the total weight of the platinum group metal and the support.

In some embodiments, the siliceous support can comprise a molecular sieve having a BEA, CDO, CON, FAU, MEL, MFI or MWW Framework Type.

SCR Catalyst

Systems of the present invention may include one or more SCR catalyst. In some embodiments, a catalyst article may include a first SCR catalyst and a second SCR catalyst. In some embodiments, the first SCR catalyst and the second SCR catalyst may comprise the same formulation as each other. In some embodiments, the first SCR catalyst and the second SCR catalyst may comprise different formulations than each other.

The exhaust system of the invention may include an SCR catalyst which is positioned downstream of an injector for introducing ammonia or a compound decomposable to ammonia into the exhaust gas. The SCR catalyst may be positioned directly downstream of the injector for injecting ammonia or a compound decomposable to ammonia (e.g. there is no intervening catalyst between the injector and the SCR catalyst).

The SCR catalyst includes a substrate and a catalyst composition. The substrate may be a flow-through substrate or a filtering substrate. When the SCR catalyst has a flow-through substrate, then the substrate may comprise the SCR catalyst composition (i.e. the SCR catalyst is obtained by extrusion) or the SCR catalyst composition may be disposed or supported on the substrate (i.e. the SCR catalyst composition is applied onto the substrate by a washcoating method).

When the SCR catalyst has a filtering substrate, then it is a selective catalytic reduction filter catalyst, which is referred to herein by the abbreviation "SCRF". The SCRF comprises a filtering substrate and the selective catalytic reduction (SCR) composition. References to use of SCR catalysts throughout this application are understood to include use of SCRF catalysts as well, where applicable.

The selective catalytic reduction composition may comprise, or consist essentially of, a metal oxide based SCR catalyst formulation, a molecular sieve based SCR catalyst formulation, or mixture thereof. Such SCR catalyst formulations are known in the art.

The selective catalytic reduction composition may comprise, or consist essentially of, a metal oxide based SCR catalyst formulation. The metal oxide based SCR catalyst formulation comprises vanadium or tungsten or a mixture thereof supported on a refractory oxide. The refractory oxide may be selected from the group consisting of alumina, silica, titania, zirconia, ceria and combinations thereof.

The metal oxide based SCR catalyst formulation may comprise, or consist essentially of, an oxide of vanadium (e.g. $V_2O_5$) and/or an oxide of tungsten (e.g. $WO_3$) supported on a refractory oxide selected from the group consisting of titania (e.g. $TiO_2$), ceria (e.g. $CeO_2$), and a mixed or composite oxide of cerium and zirconium (e.g. $Ce_xZr_{(1-x)}O_2$, wherein x=0.1 to 0.9, preferably x=0.2 to 0.5).

When the refractory oxide is titania (e.g. $TiO_2$), then preferably the concentration of the oxide of vanadium is from 0.5 to 6 wt % (e.g. of the metal oxide based SCR formulation) and/or the concentration of the oxide of tungsten (e.g. $WO_3$) is from 5 to 20 wt %. More preferably, the oxide of vanadium (e.g. $V_2O_5$) and the oxide of tungsten (e.g. $WO_3$) are supported on titania (e.g. $TiO_2$).

When the refractory oxide is ceria (e.g. $CeO_2$), then preferably the concentration of the oxide of vanadium is from 0.1 to 9 wt % (e.g. of the metal oxide based SCR formulation) and/or the concentration of the oxide of tungsten (e.g. $WO_3$) is from 0.1 to 9 wt %.

The metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$).

The selective catalytic reduction composition may comprise, or consist essentially of, a molecular sieve based SCR catalyst formulation. The molecular sieve based SCR catalyst formulation comprises a molecular sieve, which is optionally a transition metal exchanged molecular sieve. It is preferable that the SCR catalyst formulation comprises a transition metal exchanged molecular sieve.

In general, the molecular sieve based SCR catalyst formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO, where Me is a metal), or a heteroatom-containing silicoaluminophosphate framework (e.g. MeAPSO, where Me is a metal). The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based SCR catalyst formulation comprises, or consist essentially of, a molecular sieve having an aluminosilicate framework (e.g. zeolite) or a silicoaluminophosphate framework (e.g. SAPO).

When the molecular sieve has an aluminosilicate framework (e.g. the molecular sieve is a zeolite), then typically the molecular sieve has a silica to alumina molar ratio (SAR) of from 5 to 200 (e.g. 10 to 200), 10 to 100 (e.g. 10 to 30 or 20 to 80), such as 12 to 40, or 15 to 30. In some embodiments, a suitable molecular sieve has a SAR of >200; >600; or >1200. In some embodiments, the molecular sieve has a SAR of from about 1500 to about 2100.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve based SCR catalyst formulation may comprise a small pore molecular sieve (e.g. a molecular sieve having a maximum ring size of eight tetrahedral atoms), a medium pore molecular sieve (e.g. a molecular sieve having a maximum ring size often tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, ERI, LTA, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI, and STT. More preferably, the medium pore molecular sieve has a framework structure represented by a FTC selected from the group consisting of FER and MFI, particularly MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. Preferably, the large pore molecular sieve has a framework structure represented by a FTC selected from the group consisting of AFI, BEA, MAZ, MOR, and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

In general, it is preferred that the molecular sieve is a small pore molecular sieve.

The molecular sieve based SCR catalyst formulation preferably comprises a transition metal exchanged molecular sieve. The transition metal may be selected from the group consisting of cobalt, copper, iron, manganese, nickel, palladium, platinum, ruthenium and rhenium.

The transition metal may be copper. An advantage of SCR catalyst formulations containing a copper exchanged molecular sieve is that such formulations have excellent low temperature $NO_x$ reduction activity (e.g. it may be superior to the low temperature $NO_x$ reduction activity of an iron exchanged molecular sieve). Systems and method of the present invention may include any type of SCR catalyst, however, SCR catalysts including copper ("Cu-SCR catalysts") may experience more notable benefits from systems of the present invention, as they are particularly vulnerable to the effects of sulfation. Cu-SCR catalyst formulations may include, for example, Cu exchanged SAPO-34, Cu exchanged CHA zeolite, Cu exchanged AEI zeolites, or combinations thereof.

The transition metal may be present on an extra-framework site on the external surface of the molecular sieve or within a channel, cavity or cage of the molecular sieve.

Typically, the transition metal exchanged molecular sieve comprises an amount of 0.10 to 10% by weight of the transition metal exchanged molecular, preferably an amount of 0.2 to 5% by weight.

In general, the selective catalytic reduction catalyst comprises the selective catalytic reduction composition in a total concentration of 0.5 to 4.0 g in$^{-3}$, preferably 1.0 to 3.0 4.0 g in$^{-3}$.

The SCR catalyst composition may comprise a mixture of a metal oxide based SCR catalyst formulation and a molecular sieve based SCR catalyst formulation. The (a) metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$) and (b) the molecular sieve based SCR catalyst formulation may comprise a transition metal exchanged molecular sieve.

When the SCR catalyst is an SCRF, then the filtering substrate may preferably be a wall flow filter substrate monolith. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%.

The uncoated wall flow filter substrate monolith typically has a mean pore size of at least 5 μm. It is preferred that the mean pore size is from 10 to 40 μm, such as 15 to 35 μm, more preferably 20 to 30 μm.

The wall flow filter substrate may have a symmetric cell design or an asymmetric cell design.

In general for an SCRF, the selective catalytic reduction composition is disposed within the wall of the wall-flow filter substrate monolith. Additionally, the selective catalytic reduction composition may be disposed on the walls of the inlet channels and/or on the walls of the outlet channels.

Blend

Embodiments of the present invention may include a blend of (1) a platinum group metal on a support, and (2) an SCR catalyst. In some embodiments, within the blend, a weight ratio of the SCR catalyst to the platinum group metal on a support is about 3:1 to about 300:1; about 3:1 to about 250:1; about 3:1 to about 200:1; about 4:1 to about 150:1; about 5:1 to about 100:1; about 6:1 to about 90:1; about 7:1 to about 80:1; about 8:1 to about 70:1; about 9:1 to about 60:1; about 10:1 to about 50:1; about 3:1; about 4:1; about 5:1; about 6:1; about 7:1; about 8:1; about 9:1; about 10:1; about 15:1; about 20:1; about 25:1; about 30:1; about 40:1; about 50:1; about 75:1; about 100:1; about 125:1; about 150:1; about 175:1; about 200:1; about 225:1; about 250:1; about 275:1; or about 300:1.

DOC

Catalyst articles and systems of the present invention may include one or more diesel oxidation catalysts. Oxidation catalysts, and in particular diesel oxidation catalysts (DOCs), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

Substrate

Catalysts of the present invention may each further comprise a flow-through substrate or filter substrate. In one embodiment, the catalyst may be coated onto the flow-through or filter substrate, and preferably deposited on the flow-through or filter substrate using a washcoat procedure.

The combination of an SCR catalyst and a filter is known as a selective catalytic reduction filter (SCRF catalyst). An SCRF catalyst is a single-substrate device that combines the functionality of an SCR and particulate filter, and is suitable for embodiments of the present invention as desired. Description of and references to the SCR catalyst throughout this application are understood to include the SCRF catalyst as well, where applicable.

The flow-through or filter substrate is a substrate that is capable of containing catalyst/adsorber components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalyst/adsorber may be added to the flow-through or filter substrate by any known means, such as a washcoat procedure.

Reductant/Urea Injector

The system may include a means for introducing a nitrogenous reductant into the exhaust system upstream of the SCR and/or SCRF catalyst. It may be preferred that the means for introducing a nitrogenous reductant into the exhaust system is directly upstream of the SCR or SCRF catalyst (e.g. there is no intervening catalyst between the means for introducing a nitrogenous reductant and the SCR or SCRF catalyst).

The reductant is added to the flowing exhaust gas by any suitable means for introducing the reductant into the exhaust gas. Suitable means include an injector, sprayer, or feeder. Such means are well known in the art.

The nitrogenous reductant for use in the system can be ammonia per se, hydrazine, or an ammonia precursor selected from the group consisting of urea, ammonium carbonate, ammonium carbamate, ammonium hydrogen carbonate, and ammonium formate. Urea is particularly preferred.

The exhaust system may also comprise a means for controlling the introduction of reductant into the exhaust gas in order to reduce NOx therein. Preferred control means may include an electronic control unit, optionally an engine control unit, and may additionally comprise a NOx sensor located downstream of the NO reduction catalyst.

Benefits

Catalyst articles of the present invention may provide higher catalytic activity and selectivity. Additionally, in some embodiments, HC oxidation and exotherm generation may be concentrated in the rear zone, thereby protecting the front ASC zone from hydrothermal degredation.

In some embodiments, catalyst articles of the present invention may have equivalent or enhanced activity for $NH_3$ conversion compared to a catalyst article which is equivalent except does not include the first SCR catalyst and has a non-siliceous support. In some embodiments, catalyst articles of the present invention may have enhanced activity for $NH_3$ conversion compared to a catalyst article which is equivalent except does not include the first SCR catalyst and has a non-siliceous support, the inventive catalyst article showing an improvement in $NH_3$ conversion at temperatures between about 200° C. to about 300° C. of up to about 20%; up to about 15%; up to about 10%; about 1% to about 20%; about 2% to about 18%; about 3% to about 16%; about 4% to about 14%; about 5% to about 12%; about 5% to about 10%; about 1%; about 2%; about 3%; about 4%; about 5%; about 6%; about 8%; about 10%; about 12%; about 15%; about 17%; or about 20%.

In some embodiments, catalyst articles of the present invention may have equivalent or enhanced NOx conversion compared to a catalyst article which is equivalent except does not include the first SCR catalyst and has a non-siliceous support. In some embodiments, catalyst articles of the present invention may have enhanced activity for NOx conversion compared to a catalyst article which is equivalent except does not include the first SCR catalyst and has a non-siliceous support, the inventive catalyst article showing an improvement in NOx conversion at temperatures between above about 300° C. of up to about 75%; up to about 60%; up to about 50%; up to about 40%; about 1% to about 70%; about 5% to about 60%; about 10% to about 50%; about 15% to about 45%; about 20% to about 40%; about 25% to about 35%; about 1%; about 2%; about 5%; about 10%; about 15%; about 20%; about 25%; about 30%; about 35%; about 40%; about 45%; about 50%; about 55%; about 60%; about 65%; about 70%; or about 75%.

In some embodiments, catalyst articles of the present invention may have reduced activity for $N_2O$ formation at temperatures between 200° C. and 500° C. compared to a catalyst article which is equivalent except does not include the first SCR catalyst and has a non-siliceous support. In some embodiments, catalyst articles of the present invention may have reduced activity for $N_2O$ formation compared to a catalyst article which is equivalent except does not include the first SCR catalyst and has a non-siliceous support, the inventive catalyst article showing a reduction in $N_2O$ formation at temperatures between 200° C. and 500° C. of up to about 75%; up to about 60%; up to about 50%; up to about 40%; about 1% to about 70%; about 5% to about 65%; about 10% to about 60%; about 15% to about 55%; about 20% to about 50%; about 25% to about 45%; about 30% to about 40%; about 1%; about 5%; about 10%; about 15%; about 20%; about 25%; about 30%; about 35%; about 40%; about 45%; about 50%; about 55%; about 60%; about 65%; or about 70%.

In some embodiments, catalyst articles of the present invention include a first zone having reduced activity for hydrocarbon conversion at temperatures ≥250° C. compared to a catalyst article which is equivalent except does not include the first SCR catalyst and has a non-siliceous support. In some embodiments, catalyst articles of the present invention may include a first zone having reduced activity for hydrocarbon conversion compared to a catalyst article which is equivalent except does not include the first SCR catalyst and has a non-siliceous support, the first zone showing a reduction in activity for hydrocarbon conversion at temperatures ≥250° C. of up to about 95%; up to about 90%; up to about 80%; up to about 70%; up to about 60%; up to about 50%; up to about 40%; about 1% to about 95%; about 5% to about 90%; about 10%; to about 90%; about 15% to about 90%; about 20% to about 90%; about 20% to about 70%; about 20% to about 65%; about 20% to about 60%; about 20% to about 55%; about 20% to about 50%; about 25% to about 45%; about 30% to about 40%; about 1%; about 5%; about 10%; about 15%; about 20%; about 25%; about 30%; about 35%; about 40%; about 45%; about 50%; about 55%; about 60%; about 65%; about 70%; about 75%; about 80%; about 85%; about 90%; or about 95%.

In some embodiments, catalyst articles of the present invention include a first zone having reduced exotherm generation at temperatures ≥250° C. compared to a catalyst article which is equivalent except does not include the first SCR catalyst and has a non-siliceous support. In some embodiments, catalyst articles of the present invention may include a first zone having reduced exotherm generation compared to a catalyst article which is equivalent except does not include the first SCR catalyst and has a non-siliceous support, the first zone showing a reduction in exotherm generation at temperatures ≥250° C. of up to about 95%; up to about 90%; up to about 80%; up to about 70%; up to about 60%; up to about 50%; up to about 40%; about 1% to about 95%; about 5% to about 90%; about 10%; to about 90%; about 15% to about 90%; about 20% to about 90%; about 20% to about 70%; about 20% to about 65%; about 20% to about 60%; about 20% to about 55%; about 20% to about 50%; about 25% to about 45%; about 30% to about 40%; about 1%; about 5%; about 10%; about 15%; about 20%; about 25%; about 30%; about 35%; about 40%; about 45%; about 50%; about 55%; about 60%; about 65%; about 70%; about 75%; about 80%; about 85%; about 90%; or about 95%.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "ammonia slip", means the amount of unreacted ammonia that passes through the SCR catalyst.

The term "support" means the material to which a catalyst is fixed.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

When a range, or ranges, for various numerical elements are provided, the range, or ranges, can include the values, unless otherwise specified.

The term "$N_2$ selectivity" means the percent conversion of ammonia into nitrogen.

The terms "diesel oxidation catalyst" (DOC), "diesel exotherm catalyst" (DEC), "NOx absorber", "SCR/PNA" (selective catalytic reduction/passive NOx adsorber), "cold-start catalyst" (CSC) and "three-way catalyst" (TWC) are well known terms in the art used to describe various types of catalysts used to treat exhaust gases from combustion processes.

The term "platinum group metal" or "PGM" refers to platinum, palladium, ruthenium, rhodium, osmium and iridium. The platinum group metals are preferably platinum, palladium, ruthenium or rhodium.

The terms "downstream" and "upstream" describe the orientation of a catalyst or substrate where the flow of exhaust gas is from the inlet end to the outlet end of the substrate or article.

The following examples merely illustrate the invention; the skilled person will recognize many variations that are within the spirit of the invention and scope of the claims.

EXAMPLE 1

Figure 1:
FIG. 1 depicts a catalyst configuration having an SCR and an ASC/SCR blend in a first zone, and a DOC or DEC in a second zone.
Figure 4:
FIG. 4 depicts a reference catalyst configuration having an SCR and ASC layer in a first zone and a DOC or DEC in a second zone.

Catalysts according to embodiments of the present invention and reference catalysts were prepared. Two zoned ASC+DOC catalysts were prepared. A blend ASC catalyst was prepared having a first zone with an SCR catalyst top layer of Cu on a zeolite, and a bottom layer with a blend of (1) platinum on a zeolite and (2) Cu on a zeolite; and a second zone with a DOC (such as the configuration shown in FIG. 1). A traditional ASC catalyst was preparing having a first zone with an SCR catalyst top layer of Cu on a zeolite, and a bottom layer with a platinum on a zeolite (and no SCR catalyst) (such as the configuration shown in FIG. 4). Both catalysts were prepared with 3 g/ft³ of Pt loading in the ASC zone and with identical DOC zones. The catalysts were tested under conditions to simultaneously stress SCR, ASC and DOC functionalities. Specifically, the catalysts were tested under the following conditions: 1000 ppm NO, 1200 ppm $NH_3$, 200 ppm CO, 5000 ppm (C1-based) $C_{10}H_{22}$, 10% $O_2$, 10% $CO_2$, 10% $H_2O$, balance $N_2$; SV=80,000 h-1 with ASC zone only; SV=40,000 h-1 with ASC+DOC zones. In addition, to understand the individual contributions in overall performances by each zone, the two ASC catalysts (the blend ASC and the traditional ASC) were also tested alone without the rear DOC zone.

Results for NO conversion, HC conversion, $N_2O$ formation, outlet temperature, $NH_3$ conversion, CO conversion, and $N_2$ yield are included in FIGS. 5-11.

Figure 5:
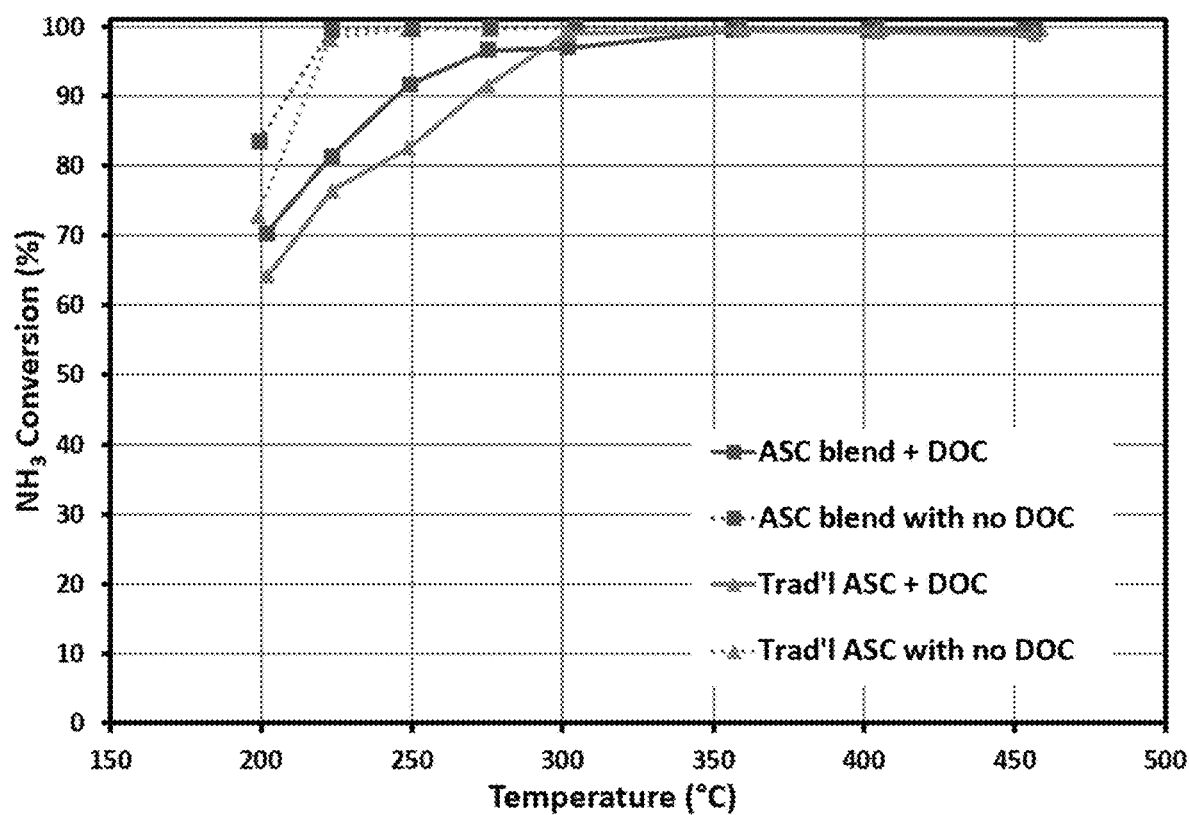
FIG. 5 shows $NH_3$ conversion of inventive and reference catalysts.
Figure 6:
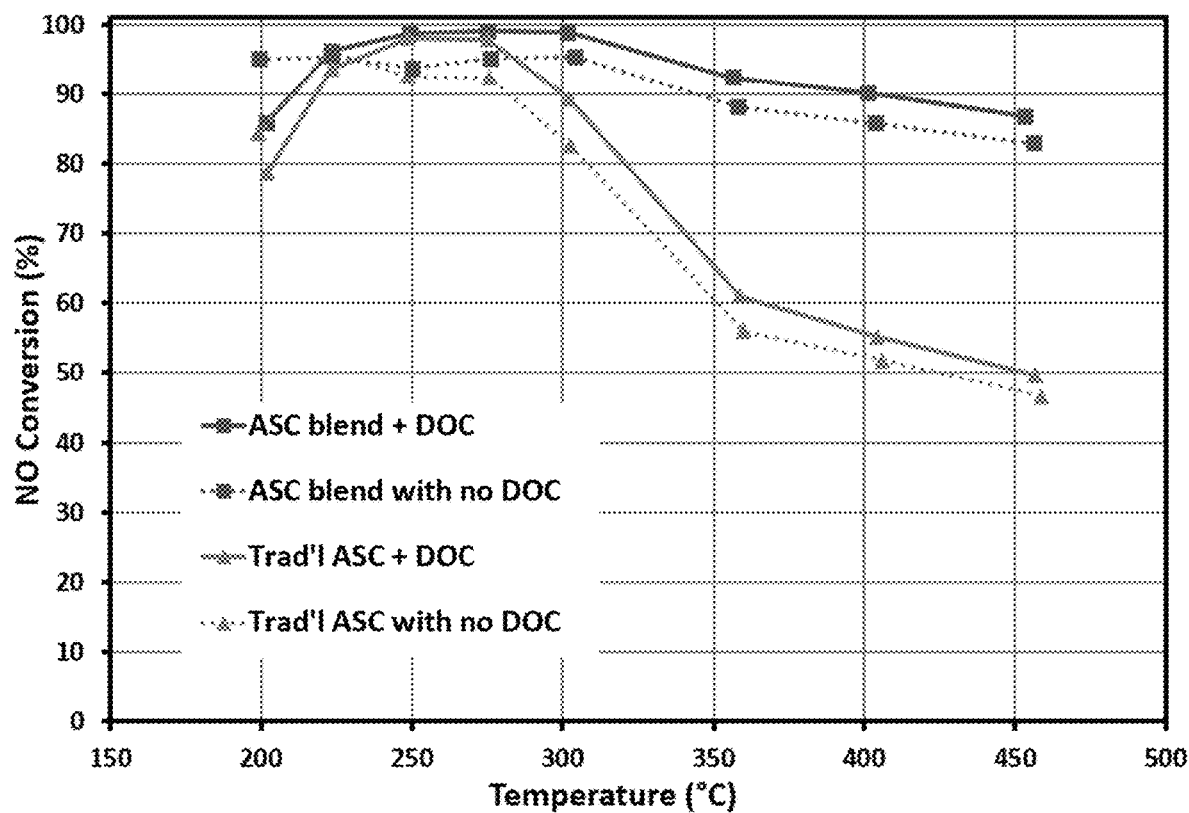
FIG. 6 shows NO conversion of inventive and reference catalysts.
Figure 7:
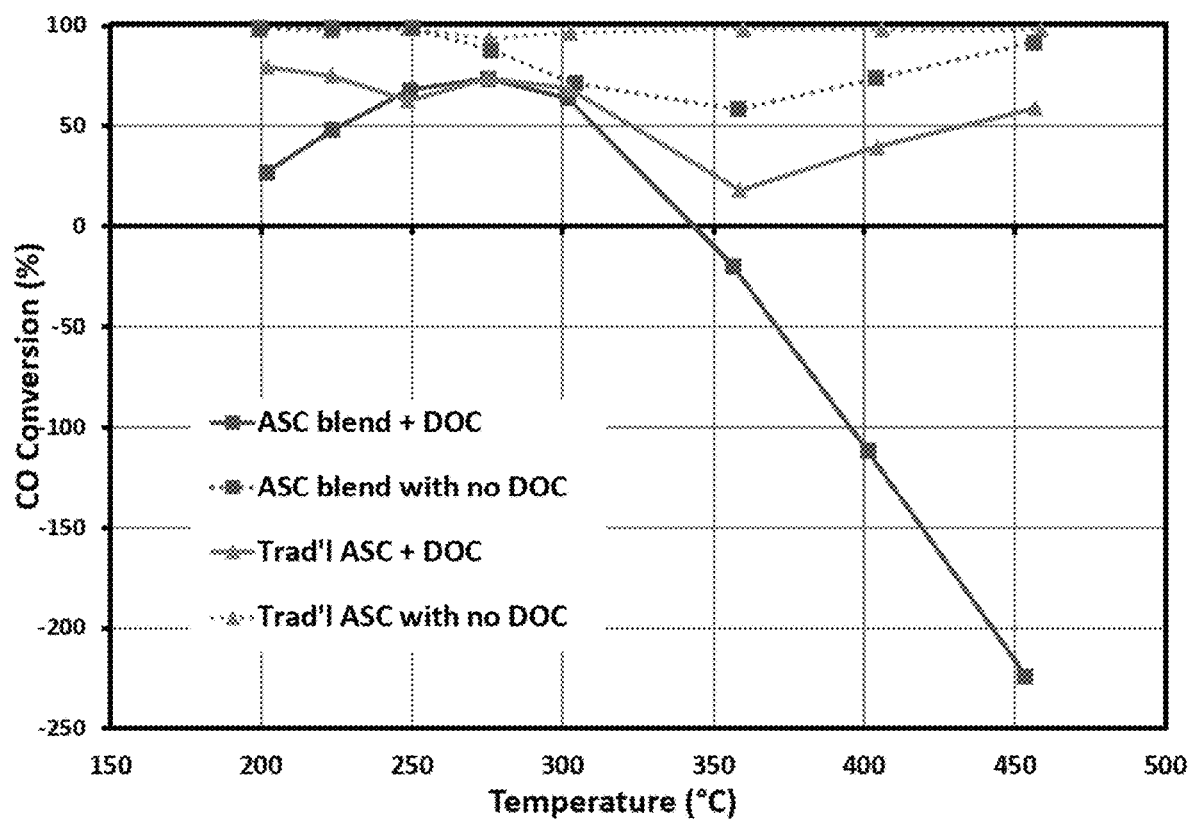
FIG. 7 shows CO conversion of inventive and reference catalysts.

Comparing $NH_3$ conversions as shown in FIG. 5, both ASCs showed equivalent performances either with or without a downstream DOC. On the other hand, due to the higher $N_2$ selectivity of the blend ASC, it demonstrated a much higher NO conversion (FIG. 6) and lower $N_2O$ formation (FIG. 9) compared to the traditional ASC. These results suggest the blend ASC is a superior catalyst for both NOx reduction and $NH_3$ slip control under those conditions.

Figure 8:
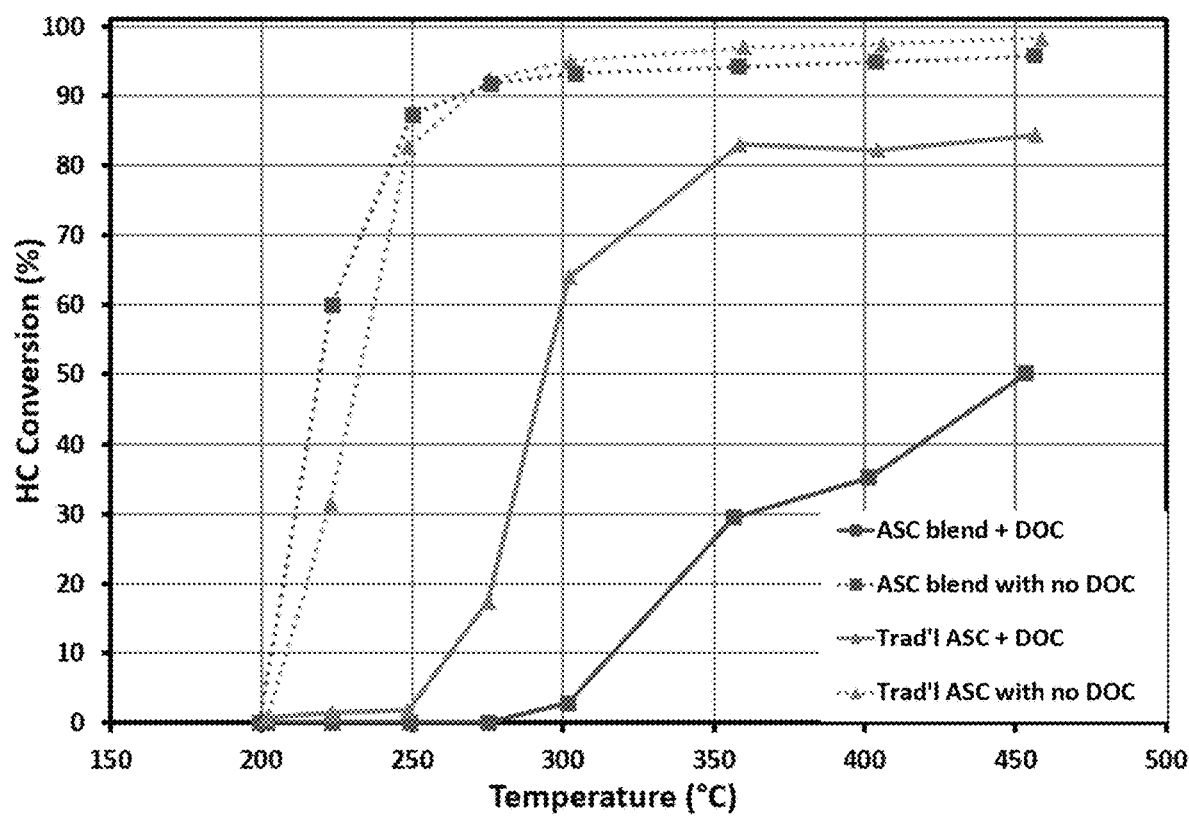
FIG. 8 shows HC conversion of inventive and reference catalysts.
Figure 9:
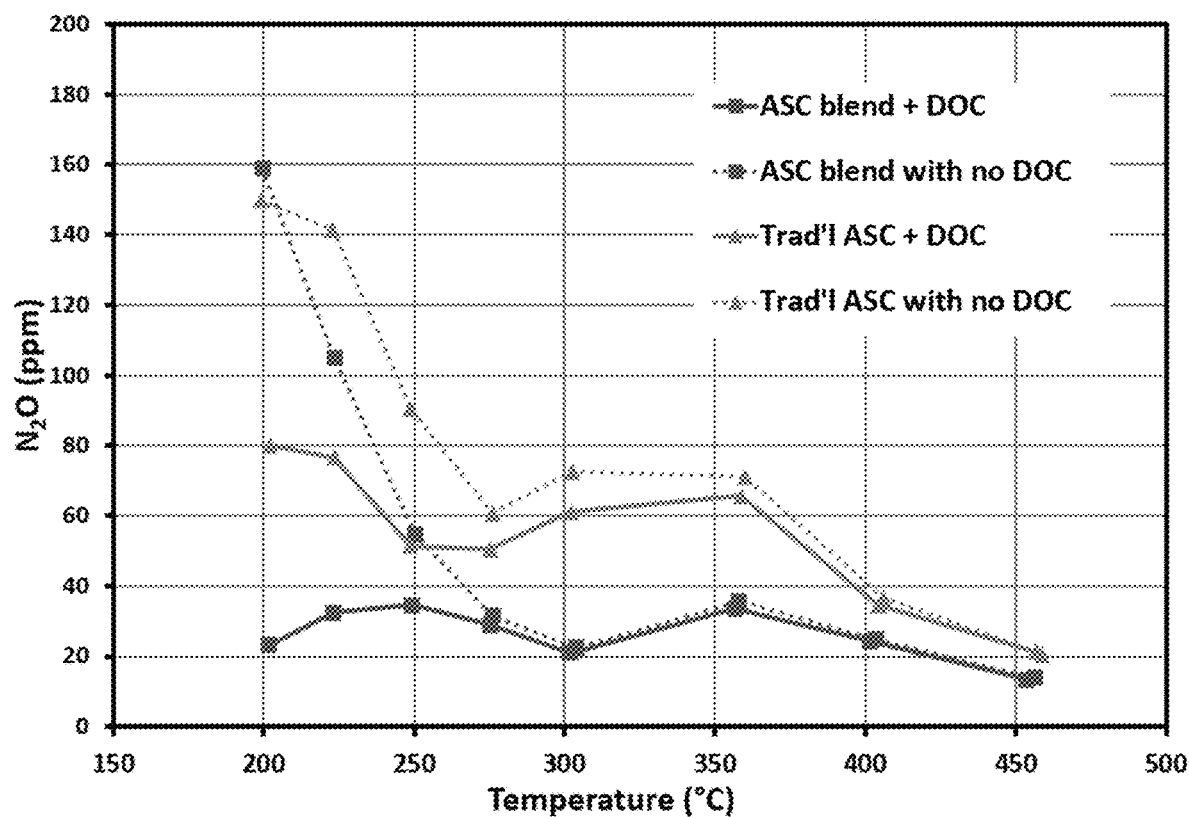
FIG. 9 shows $N_2O$ formation of inventive and reference catalysts.
Figure 10:
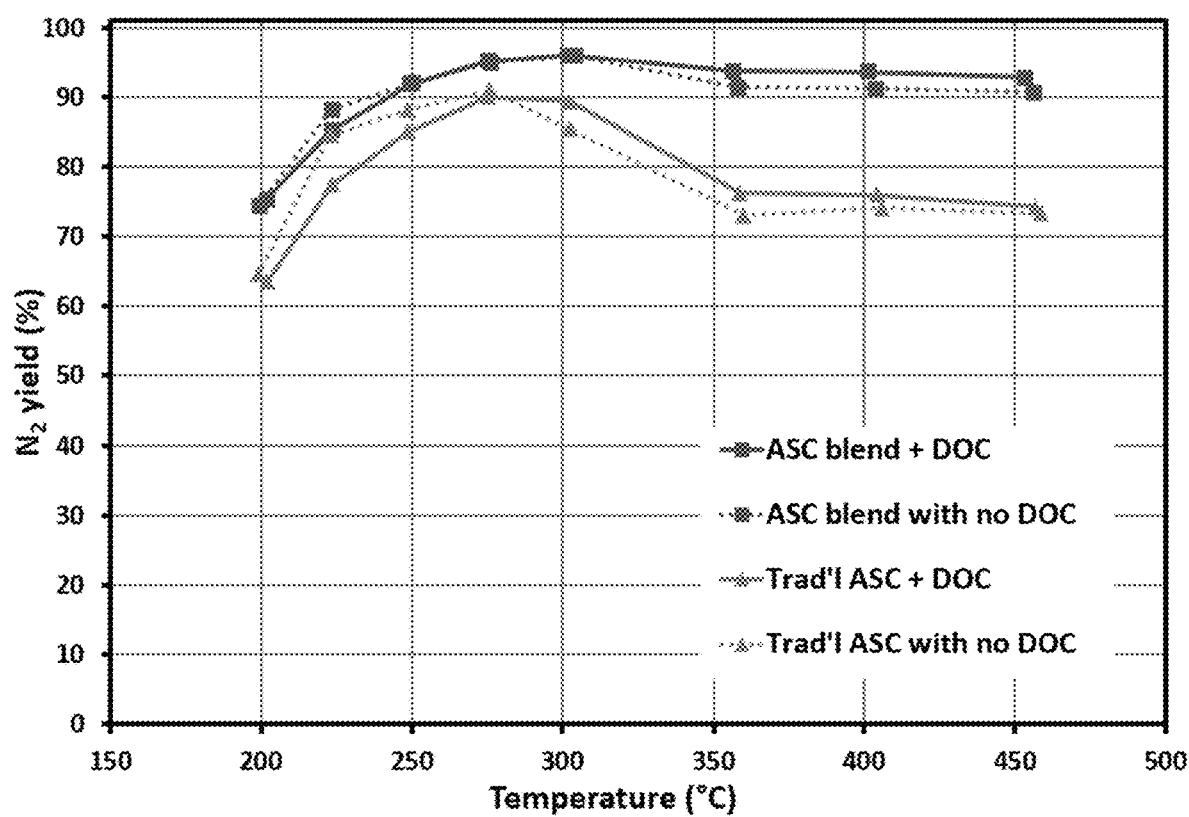
FIG. 10 shows $N_2$ yield of inventive and reference catalysts.
Figure 11:
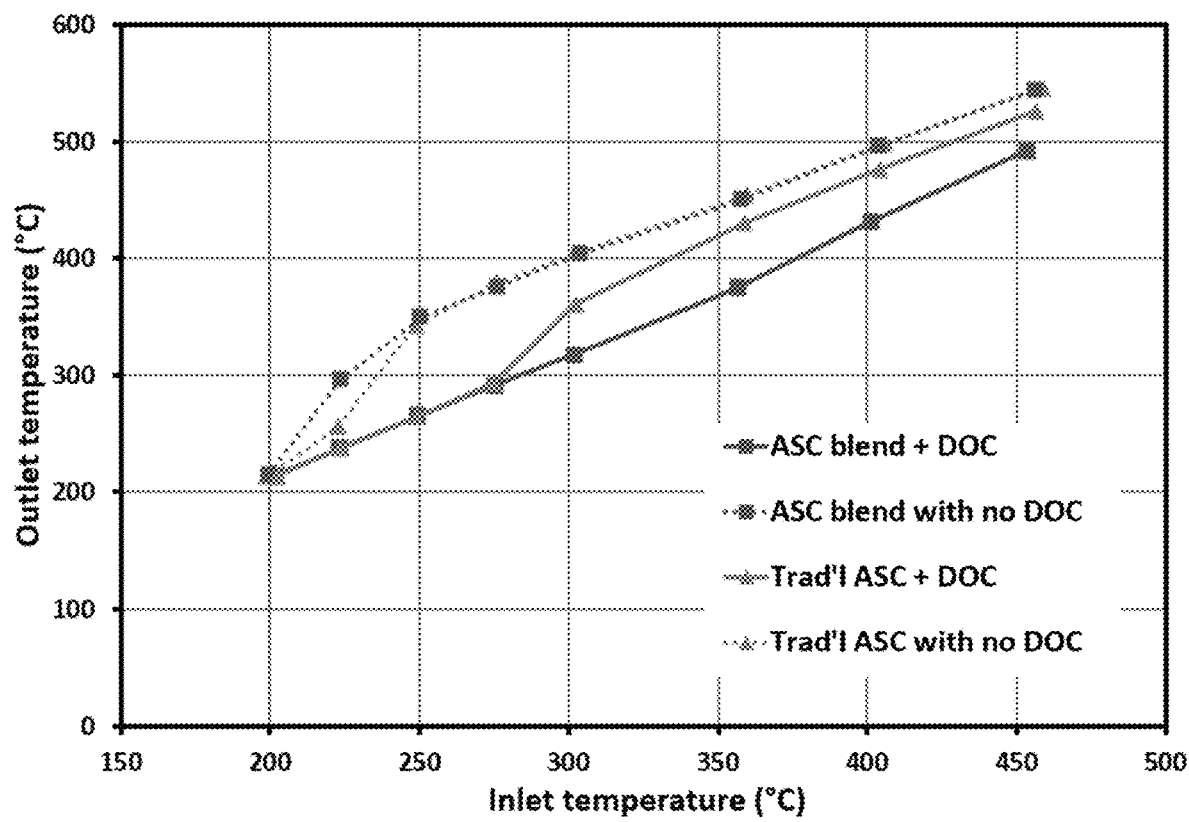
FIG. 11 shows outlet temperature of inventive and reference catalysts.

Surprisingly, the blend ASC exhibits significantly lower activity for HC conversion (FIG. 8) and exotherm generation (FIG. 11) compared to the traditional ASC (e.g. ~30% HC conversion vs. ~80% conversion at 350° C.). The lower HC conversion on the blend ASC, however, does not impact the exothermal generation from the ASC+DOC system; as shown in FIGS. 8 and 11, the total system (ASC+DOC) achieves equivalent HC conversion and exotherm generation regardless the type of upstream ASC. Those results suggests that compared to a traditional ASC+DOC system, the blend ASC+DOC has a majority of the HC conversion occurring at the rear end DOC zone with little HC conversion and exotherm generation in the front ASC zone. It is known that hydrothermal aging causes a decrease in $N_2$ selectivity (from degradation of the SCR component) and potentially a decrease of activity (from Pt migration/volatilization); therefore, in the inventive catalyst, it has been found that the ASC component/functionality is effectively protected from hydrothermal exposure during HC/fuel injection event.

EXAMPLE 2

A non-zoned DOC catalyst was prepared as a reference for gauging exotherm generation with fuel injection at DOC inlet on engine. A blend ASC catalyst was prepared having a first zone with an SCR catalyst top layer of Cu on a zeolite, and a bottom layer with a blend of (1) platinum on a zeolite and (2) Cu on a zeolite; and a second zone with a DOC (such as the configuration shown in FIG. 1). Second zone contained identical DOC catalyst as the reference non-zoned DOC, but with PGM concentrated in this zone (higher PGM density in g/ft³) to achieve same total DOC PGM loading (g). ASC zone contained 3 g/ft³ Pt loading.

Figure 12:
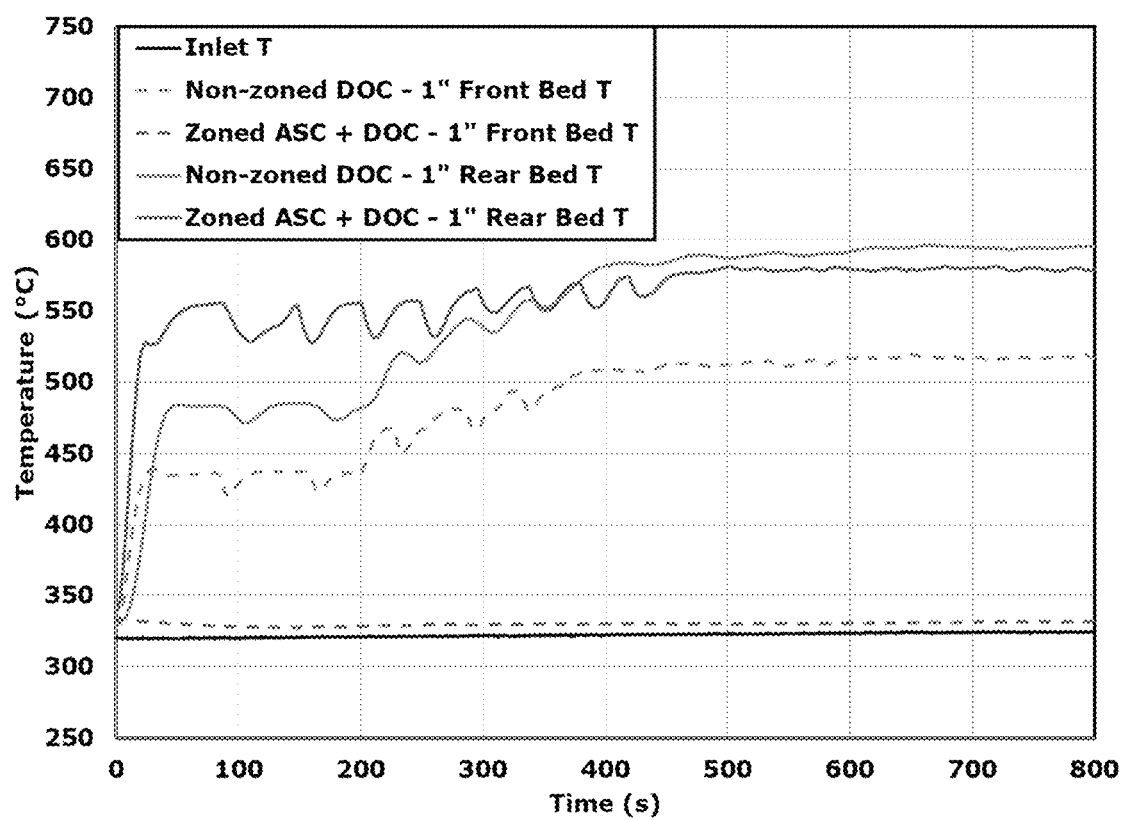
FIG. 12 shows temperature readings during exotherm generation test.

Exotherm generation test was run on engine targeting an inlet temperature of 320° C. and SV of 70,000 $h^{-1}$ with ASC+DOC zones. After stabilization of inlet temperature, fuel injection at DOC inlet was enabled to achieve an outlet temperature of 580° C. Thermocouples were inserted across the catalyst bed to monitor and distinguish exotherm generation at 1" from front and 1" from rear on reference non-zoned DOC and zoned ASC+DOC. Comparison of these temperatures during exotherm generation test is included in FIG. 12. Targeting same inlet and outlet temperature during fuel injection, it is evident that temperature readings at 1" from front bed are much lower on zoned ASC+DOC (~330° C.) than non-zoned DOC (515° C.) at steady state portion of the test. This example supports the aforementioned benefit in protecting the front ASC zone from hydrothermal degradation by lack of high temperature exposure during exotherm generation in this zone. It is also worth noting that faster rise in temperatures observed during earlier portion of the test at 1" from rear on ASC+zoned DOC, compared to non-zoned DOC, highlighting that exotherm generation is concentrated in the rear zone by placement of DOC zone in the rear.

The invention claimed is:

1. A catalyst article comprising a substrate comprising an inlet side and an outlet side, a first zone and a second zone,
    wherein the first zone comprises an ammonia slip catalyst (ASC) comprising a platinum group metal on a support and a first SCR catalyst;
    wherein the second zone comprises a catalyst selected from the group consisting of a diesel oxidation catalyst (DOC) and a diesel exotherm catalyst (DEC); and
    wherein the first zone is located upstream of the second zone.

2. The catalyst article of claim 1, wherein the first zone comprises
    a. a bottom layer comprising a blend of: (1) the platinum group metal on a support and (2) the first SCR catalyst;
    b. a top layer comprising a second SCR catalyst, the top layer located over the bottom layer.

3. The catalyst article of claim 2, wherein, within the blend, a weight ratio of the first SCR catalyst to the platinum group metal on a support is about 5:1 to about 100:1.

4. The catalyst article of claim 1, wherein the support comprises a siliceous material.

5. The catalyst article of claim 4, wherein the siliceous material comprises a material selected from the group consisting of: (1) silica; (2) a zeolite with a silica-to-alumina ratio higher than 200; and (3) amorphous silica-doped alumina with $SiO_2$ content >40%.

6. The catalyst article of claim 1, wherein the platinum group metal is present on the support in an amount of about 0.5 wt % to about 10 wt % of the total weight of the platinum group metal and the support.

7. The catalyst article of claim 1, wherein the first SCR catalyst comprises copper.

8. The catalyst article of claim 1, wherein the first zone and the second zone are located on a single substrate and the first zone is located on the inlet side of the substrate and the second zone is located on the outlet side of the substrate.

9. The catalyst article of claim 1, wherein the substrate comprises a first substrate and a second substrate, where the first zone is located on the first substrate and the second zone is located on the second substrate and the first substrate is located upstream of the second substrate.

10. The catalyst article of claim 1, wherein the first zone comprises
    a. a bottom layer comprising the platinum group metal on a support;
    b. a top layer comprising the first SCR catalyst, the top layer located over the bottom layer.

11. A method of reducing emissions from an exhaust stream, comprising contacting the exhaust stream with the catalyst article of claim 1.

12. A catalyst article comprising a substrate comprising an inlet end and an outlet end, a first zone, a second zone, and a third zone,
    wherein the first zone comprises a second SCR catalyst;
    wherein the second zone comprises an ammonia slip catalyst (ASC) comprising a blend of: (1) a platinum group metal on a support and (2) a first SCR catalyst;
    wherein the third zone comprises a catalyst ("third zone catalyst") selected from the group consisting of a diesel oxidation catalyst (DOC) and a diesel exotherm catalyst (DEC); and wherein the first zone is located upstream of the second zone, and the second zone is located upstream of the third zone.

13. The catalyst article of claim 12, wherein
the ASC is included in a first layer;
the third zone catalyst is included in a second layer which extends from the outlet end to less than a total length of the substrate, where the second layer is located on top of the first layer and is shorter in length than the first layer; and
the second SCR catalyst is included in a layer which extends from the inlet end to less than a total length of the substrate, and which at least partially overlaps the first layer.

14. The catalyst article of claim 13, wherein the first layer extends from the outlet end to less than a total length of the substrate.

15. The catalyst article of claim 12, wherein the support comprises a siliceous material.

16. The catalyst article of claim 15, wherein the siliceous material comprises a material selected from the group consisting of: (1) silica; (2) a zeolite with a silica-to-alumina ratio higher than 200; and (3) amorphous silica-doped alumina with $SiO_2$ content >40%.

17. The catalyst article of claim 12, wherein the platinum group metal is present on the support in an amount of about 1 wt % to about 6 wt % of the total weight of the platinum group metal and the support.

18. The catalyst article of claim 12, wherein, within the blend, a weight ratio of the first SCR catalyst to the platinum group metal on a support is about 5:1 to about 100:1.

19. The catalyst article of claim 12, wherein the first SCR catalyst comprises copper.

20. The catalyst article of claim 12, wherein the first zone, the second zone, and the third zone are located on a single substrate and the first zone is located on the inlet side of the substrate and the third zone is located on the outlet side of the substrate.

21. The catalyst article of claim 12, wherein the substrate comprises a first substrate and a second substrate, where the first zone and second zone are located on the first substrate and the third zone is located on the second substrate and the first substrate is located upstream of the second substrate.

22. The catalyst article of claim 12, wherein the substrate comprises a first substrate, a second substrate, and a third substrate, where the first zone is located on the first substrate, the second zone is located on the second substrate, and the third zone is located on the third substrate, and the first substrate is located upstream of the second substrate and the second substrate is located upstream of the third substrate.

23. A method of reducing emissions from an exhaust stream, comprising contacting the exhaust stream with the catalyst article of claim 12.

* * * * *